J. E. TAYLOR,
Assignor to TAYLOR, NICHOLS, & Co.
Printing Attachment for Paper-Ruling Machines.
No. 9,141. Reissued April 6, 1880.
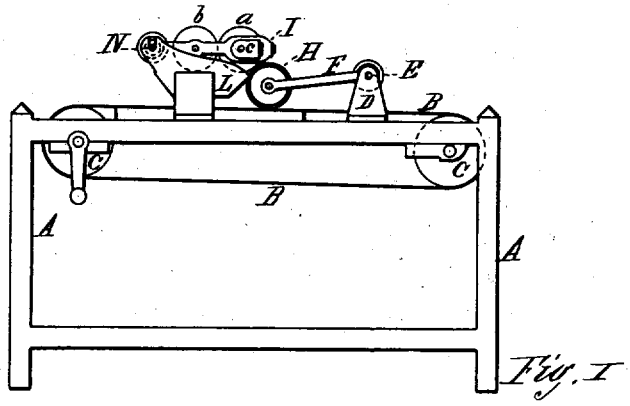
Fig. I
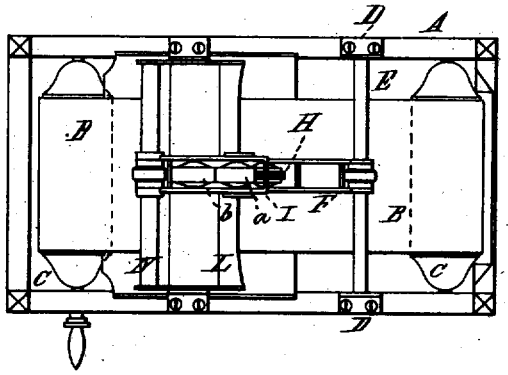
Fig. II
Witnesses.
Dexter Smith
C. E. Buckland
Inventor
John E. Taylor
By T. A. Curtis,
his Atty.
N. PETERS, PHOTO-LITHOGRAPHER, WASHINGTON, D. C.

UNITED STATES PATENT OFFICE.

JOHN E. TAYLOR, OF SPRINGFIELD, MASSACHUSETTS, ASSIGNOR TO TAYLOR, NICHOLS & CO.

PRINTING ATTACHMENT FOR PAPER-RULING MACHINES.

SPECIFICATION forming part of Reissued Letters Patent No. 9,141, dated April 6, 1880.

Original No. 199,003, dated January 8, 1878. Application for reissue filed March 29, 1878.

*To all whom it may concern:*

Be it known that I, JOHN E. TAYLOR, of Springfield, in the State of Massachusetts, have invented a new and useful Printing Attachment for Paper-Ruling Machines; and I do hereby declare that the following is a full, clear, and exact description thereof, reference being had to the accompanying drawings, making a part of this specification, and to the letters of reference marked thereon.

My invention has for its object the printing of ornamental or other matter upon sheets of paper at the same time they are being ruled; and to this end my invention consists of a printing-roll arranged to revolve in suitable bearings upon a ruling-machine outside of or above the endless feeding-apron, the said printing-roll resting upon or bearing against the paper as it is being carried along by and upon the feeding-apron, and having ink applied to the printing-surface, around its periphery, by means of one or more rolls, also revolving in suitable bearings upon the machine, all which will be more fully hereinafter described.

Figure I is a side elevation of a ruling-machine having my invention applied thereto, and Fig. II is a plan view of the same.

In the drawings, A is the frame of any ordinary ruling-machine for ruling paper, which, in this case, contains two drums or cylinders, C, which carry the endless feeding-apron B, upon which the paper is placed and carried beneath the ruling-pens, which are attached in the usual manner.

A roll, H, having upon its periphery any desired printing-characters for printing ornamentation or other printed matter, is arranged to revolve in suitable bearings upon the machine, preferably in a frame, F, and this roll may be made of any suitable material; but I prefer to make it of either wood or metal, with a rubber band having the desired printing-characters made on its outer surface placed around the roll.

A supporting-frame, I, may also be attached to the ruling-machine above the feeding-apron, which supports the rolls *a* and *b*, the latter revolving sufficiently low in the trough L to take up some of the ink contained therein and convey it to the roll *a*, as the peripheries of the rolls *a* and *b* move in contact, while the periphery of the roll *a*, to which ink is conveyed by the roll *b*, touches and rolls against the printing-surface on the roll H, or on the rubber band placed thereon.

The printing-roll is so arranged in its bearings that it may be moved to and fro across the machine, and be adjusted or secured at any desired point above the feeding-apron, with a corresponding adjustment of the inking-rolls, so that the latter may roll against the printing-surface of the rubber band at whatever point the printing-roll may be fixed above the feeding-apron.

The operation of the invention is as follows: If it is desired to print an ornamented border upon paper while it is being ruled, the printing-roll H is adjusted to the desired point across the machine, so that the border may be printed at the desired point upon the paper as compared with the ruled lines to be made by the pens, the latter being attached and adjusted in the ordinary manner; and the inking-rolls *a* and *b* are correspondingly adjusted, so that the ink may be conveyed from the trough L to the roll *a*, and thence to the printing-surface upon the roll H, or upon the rubber band placed thereon.

The roll *a* or *b* may, however, be first saturated with ink, if desired, instead of taking it from the trough, the periphery of the roll being covered with some absorbing material for the purpose of retaining the ink, and fresh ink being supplied thereafter as often as required.

A small box, *c*, may be inserted in the frame I, in which the roll *a* may be pivoted or have its bearings, with a small spring in the end of the frame bearing against the box to keep the two rolls *a* and *b* always in contact; but this is not an essential feature of the invention.

It is evident that any desired number of printing-rolls H may be arranged along a shaft or rod, E, extending across the machine above the feeding-apron, with a corresponding supply of inking-rolls attached to the machine.

As the paper is placed upon the endless feeding-apron B, and is carried along and being ruled, the printing-roll bears against the paper, and the roll being thereby caused to revolve, the desired ornamentation or other matter is printed upon the paper.

The printed matter upon bill-heads may be printed in this manner while the paper is being ruled, and at the same motion or feeding of the paper, thus saving extra handling of the paper for printing, and saving expense; and ornamented borders may be printed upon writing-paper while being ruled, and upon envelopes at the same time, making such stationary very attractive and comparatively inexpensive.

Having thus described my invention, what I claim as new is—

The combination of a movable and adjustable printing-roll, H, arranged to be moved along and secured at any desired point upon the rod E, and the feeding-apron of a paper-ruling machine, upon which the paper is carried and against which the roll presses the paper while printing it, whereby the paper may be printed at the same time it is being carried through the machine to be ruled, substantially as described.

JOHN E. TAYLOR.

Witnesses:
T. A. CURTIS,
C. E. BUCKLAND.